Dec. 7, 1965  E. G. SWICK  3,221,572
CABLE FASTENER ASSEMBLY
Filed Sept. 30, 1963
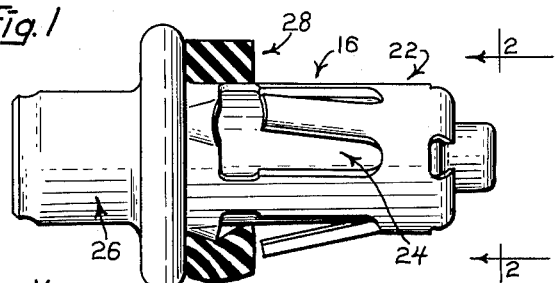
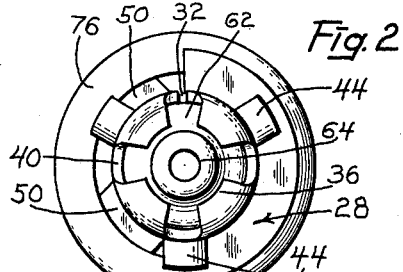
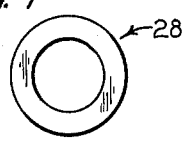
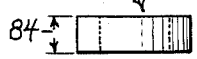
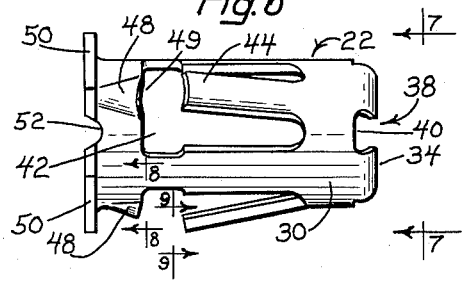
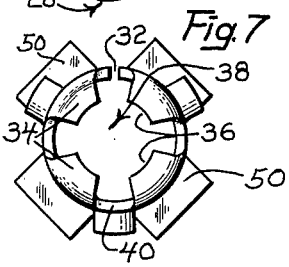
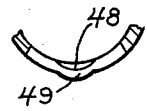
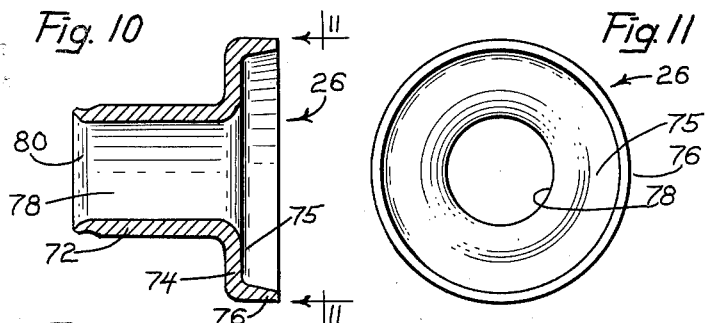
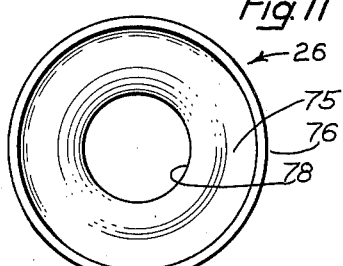
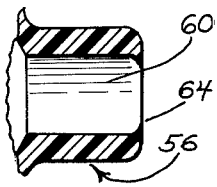
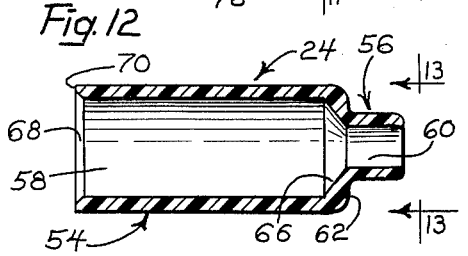
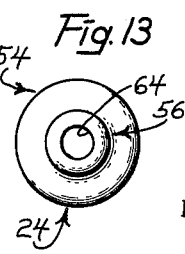
INVENTOR.
Edwin Grant Swick
BY
His Att'y United States Patent Office 3,221,572
Patented Dec. 7, 1965

3,221,572
CABLE FASTENER ASSEMBLY
Edwin Grant Swick, Bartlett, Ill., assignor to Illinois Tool Works Inc., Chicago, Ill., a corporation of Delaware
Filed Sept. 30, 1963, Ser. No. 312,545
11 Claims. (Cl. 74—501)

This invention relates to a means for fastening a cable to a workplate and the assembly so formed and more particularly relates to a means for fastening a brake cable to a workplate, for example, a workplate such as the brake drum housing on a motor vehicle or the like.

Various brake cable fastening assemblies have been heretofore proposed which have suffered the various disabilities of being cumbersone, expensive, subject to breakage in actual field use, for example, on a motor vehicle.

It is an object of this invention to provide a brake cable assembly fastening means and assembly which overcomes these disabilities.

It is a further object of this invention to provide a brake cable assembly which is exceedingly rugged and strong having great structural integrity for withstanding the rigors of actual field use.

A further object of this invention is to provide a brake cable assembly which is easy to assemble, both as an initial subassembly and in its final field use, is economical, snaps into place on a workplate on a motor vehicle or the like with the use of unskilled labor without requiring any special tools or additional parts.

A still further object of this invention is to provide a sealing type of brake cable assembly wherein there is a seal between the workplate and the fastener means which is particularly characterized as being not subject to destruction in field use even though rather extreme pressures and forces are involved.

A further object of this invention is to provide a grease seal between the cable member and the cable housing member which prevents the withdrawal of grease associated with the cable member upon outward movement from the assembly and prevents dust, dirt and other contaminants from entering the assembly upon inward movement of the cable member.

A further object of the invention is to provide a brake cable assembly which, once located in place, is so constructed as to eliminate rattling by elimination of relative movement between metallic parts and simultaneously protects the area adjacent the end of the cable housing.

A still further object of this invention is to provide a back-up means for the sealing means to prevent destruction thereof in field use.

A still further object of this invention is to provide resilient lateral support means and protection means for the brake cable housing within the fastener assembly while preventing metal to metal binding contact between the brake cable member and the fastening assembly.

Still another object of this invention is to provide a brake cable fastening means which prevents dislodgement of the cable and allows relative axial cocking of the cable relative to the workplate without destruction of the fastening means.

The novel features that are characteristic of this invention are set forth with particularity in the appended claims. the invention itself, however, both as to its organization and its method of operation, together with additional objects and advantages thereof, will best be understood by the following description of a specific embodiment when read in connection with the accompanying drawings in which:

FIG. 1 is a side elevational view, partially in section, of the fastener means prior to the assembly thereof to the brake cable;

FIG. 2 is a view of the subassembly shown in FIG. 1 along lines 2–2 of FIG. 1;

FIG. 3 is an axial sectional view through a brake cable assembly in its assembled position to a workplate showing a relative position of the parts with a slight pull being exerted on the brake cable member;

FIG. 4 is a detached plan view of the gasket member shown in FIG. 1;

FIG. 5 is a side elevational view of the gasket shown in FIG. 4;

FIG. 6 is a detached side elevational view of the tubular latching clip portion of the fastening means prior to assembly thereof as shown in FIG. 1;

FIG. 7 is an end view along lines 7–7 of FIG. 6;

FIG. 8 is a fragmentary sectional view along lines 8–8 of FIG. 6;

FIG. 9 is a fragmentary view along lines 9–9 of FIG. 6;

FIG. 10 is a side elevational sectional view of one component of the fastening means shown in FIG. 1 in detached relation prior to assembly thereof;

FIG. 11 is an end view along lines 10–10 of FIG. 11;

FIG. 12 is a detached sectional view through the resilient insert portion of the assembly shown in FIG. 1;

FIG. 13 is a view along lines 13–13 of FIG. 12; and

FIG. 14 is a fragmentary enlarged sectional view of the end portion of the resilient insert member illustrating the flashing formed thereon for wiping purposes.

Returning now to FIG. 3 of the drawings, an assembly 10 comprising a workplate 12 having an aperture 14 therein receives the fastening means 16 (shown in FIG. 1) for fixedly and sealingly mounting a brake cable housing means 18 having a relatively movable cable member 20 therewithin. It will be realized that while the instant invention shall be discussed in terms of a brake cable assembly, the assembly has equal application to any cable having a housing means and a relatively movable member, such assemblies also finding use in aircraft, industrial applications, etc.

The fastener means 16 generally comprises a latching clip means member 22, a resilient insert means 24, a sleeve means 26, and a gasket means 28. The fastening means 16 forms a first subassembly, the fastener means and cable in assembled relation form a second subassembly, and when the fastening means and cable means are associated with a workplate, a final assembly 10 is formed.

The latching clip means portion 22 of the fastener means 16 generally comprises a tubular main body portion 30 which is preferably formed of sturdy hardened steel which was originally in sheet form to afford the split construction shown by the split line 32 shown in FIG. 7. Radially inwardly directed tabs 34 are formed at one end as shown in quadrature. The end tabs 34 may be formed in a manner to have square or curvilinear end surfaces 36 which define an aperture 38 of predetermined diameter. It will be noted that the blanking procedure for forming the tabs 34 is such that the blank-out portions 40 between adjacent tabs extend into the main body portion 30 so that forming forces will be lessened in the bending of the tabs 34. The tabs 34 are relatively short and stubby construction having a tapered configuration, the wide portion being adjacent to the juncture with the main body portion 30.

The tubular main body portion 30 is also formed with a plurality of U-shaped blanks 42 to define latching tang means 44 having free end surfaces 46 for engaging one side of the work panel 12. The tangs 44 are curvilinear across the short dimension thereof to facilitate easy radially inward flexure without binding during insertion thereof within the hole 14 in the workplate 12. The tangs 44 are of a length to be flexible and the free ends 46 will move radially inwardly upon insertion within the hole 14 snapping out into the position shown in FIG. 3 for retention of the cable assembly on the workplate as shall become apparent. The tangs 44, as well as the entire latching clip means 22, is preferably formed of hardened and tempered steel, the steel having a thickness in the vicinity of a 20th of an inch when used with cable housings in the vicinity of ½ of an inch. In the illustrated embodiment there are three cutouts 42 and thus three tangs 44 although this may be varied to suit. In the base of the U-shaped blank cutout 42 and in direct opposition to the tangs 44 are stop means 48 in the form of half dimples or the like which are distorted radially outwardy from the main portion 30 to provide an end surface 49 for purposes hereinafter appearing.

The second end of the latching clip means 22 is formed with four outwardly extending tabs 50 which are separated by cutouts 52 which also extend into the main body portion again for purposes of preventing fracture at the bend line of the tabs. It will be noted that the tabs 50 are relatively sturdy and extend outwardly substantially transverse to the main body portion 30. The outwardly extent of the tabs 50 is preferably greater than the diameter of the hole 14 in the workpiece 12.

The resilient insert means 24 is disposed within the latching clip means 22 prior to the assembly of the sleeve means 26 to the latching clip means. The insert means 24 is preferably formed from a tough somewhat resilient plastic material such as "Nylon," "Delrin" or the like and has a generally tubular configuration in the main body portion 54 thereof with a necked down portion 56 at one end. The internal diameter 58 of portion 54 surrounds the cable housing 18 as shown in FIG. 3 and the internal diameter 60 of the necked down portion 56 is preferably slightly greater than the cable member 20 which extends therethrough as also shown in FIG. 3. An outer shoulder 62 between portions 54 and 56 snugly fits against the tabs 34 defining the aperture 38 in the latching clip means 22, the outer diameter of portion 56 being of a size to be accepted within aperture 38. The inner shoulder 66 adjacent the junction of the necked down portion with the main body portion receives the end 19 of the cable which is jammed thereagainst. At the terminal end of the free end necked down portion 60 is a flashing 64 which preferably has an inner diameter at the extreme edge thereof slightly less than the diameter of the cable member 20 which passes therethrough. This flashing lip portion 64 serves the function of retaining grease that may be on the cables for lubricated movement of the cable member 20 relative to the housing 18, within the confines of the necked down portion 56 upon outward movement of the cable member 20. On reverse movement, i.e., inward movement of the member 20, dirt and contaminants are also wiped by portion 64 to prevent an abrading action of the cable member with the cable housing; also contact with corners of the tabs 34 is prevented. It will be noted that a chamfer 68 is disposed on the tubular main body portion 54 at the open end thereof to facilitate initial entry of the cable housing 18 during the subassembly operation. Also to be noted is that the length of the insert as measured between the extreme terminal portion 70 and the shoulder 62 is less than the dimension between the tabs 34 and the terminal surface of tabs 50 so that in essence insert means 24 will float within the subassembly after the attachment of the sleeve member 26 to the tabs 50 in a manner to be explained. The reason for the floating relationship is to assure that the tubular portion 54 does not get distorted and bowed inwardly by the assembly of the sleeve member 26 to the latching clip member 22. Thus, cable housing end 19 will bottom on shoulder 66 and shoulder 62 will bottom on the tabs 34 upon the assembly of the fastener means 16 to the cable 18.

The sleeve means 26 is preferably made of a low carbon steel which may be deep drawn. The material preferably has a Rockwell hardness that is characterized as being "soft" for purposes hereinafter appearing. The sleeve means 26 has an original shape as shown in FIG. 10 (prior to its assembly over the tabs 50 of the latching clip means 22). More particularly, the sleeve means has a relatively elongated neck portion 72 with an enlarged flange portion 74 adjacent one end terminating in a terminal edge 76. The edge 76, after seating of the tabs 50 on the flange shoulder 75, is spun or staked over the tabs 50 as shown in FIG. 3. (The tabs 50 may have curvilinear end surfaces.) This, of course, fixedly attaches the sleeve means 26 to the latching clip means 22. The inner diameter of the neck portion 72 is substantially close to that of the outer diameter of the cable housing 18 and it will be noted that the free end portion of 72 is formed with a chamfer 80 to facilitate initial assembly of the fastener unit 16 to the cable 18. Of particular interest is the wide smooth metal portion formed by the turning or staking over of end 76 of the flange portion 74 of the sleeve means. Due to the configuration shown in FIG. 3 after assembly to the clip member (the insert means 24 already being disposed inside of the clip member), the gasket type washer 28 has a smooth surface to engage for sealing the assembly 10 relative to the workplate 12. The softness of the neck portion 72 permits the metal to be deformed in an automatic crimping operation so that the metal is forced, as shown at 82 in FIG. 3, into irregularities (here shown as helical windings) of the cable sheath 18.

The gasket means 28 may be made of material such as neoprene or the like, said gasket being annular in nature as shown in FIGS. 4 and 5. The gasket means 28 has a predetermined thickness shown by the reference numeral 84, which is greater than the designed distance between the folded over flange 76 of the sleeve means and the workpanel 12 when the fastener means is assembled to the workpanel.

It will be noted that, as shown in FIG. 3, the ends of the stop means 48 are normally spaced from the panel in the final assembly and the gasket is compressed providing a resilient take-up and a sealing relationship. The stop means 48 prevent over-compression of the washer or gasket means 28 while allowing an effective seal to be maintained between the workplate 12 and the shoulder flange 76. It will be further noted that the length of the insert main body portion 54 is such that it protects the cable housing from dirt and contamination that would normally enter through the various apertures for the tabs and tangs in the clip member 22.

From the foregoing description it will be seen that I have disclosed a strong, rugged, easily assembled, sealing type cable assembly which protects the cable member and the cable housing member, permits a slight amount of relative cocking of the fastener means to the workplate, has resilient take-up for torsional forces, and which stands up well in the rigors of actual field use.

Although a specific embodiment of the invention has been shown and described, it is with full awareness that many modifications thereof are possible. The invention, therefore, is not to be restricted except insofar as is necessitated by the prior art and by the spirit of the appended claims.

I claim:
1. A cable assembly adapted to pass through a hole in a workplate comprising in combination:
  (a) cable means comprising metallic cable housing means having an end portion and a cable member relatively movable to said cable housing means,
  (b) latching clip means surroundingly disposed to said end portion of said cable housing means, said latching clip means being of generally tubular configuration having a first end portion with an aperture therein smaller in diameter than said cable housing means and larger than said cable member which passes therethrough,
  (c) said latching clip means at the second end having a sharply flared peripheral edge means portion disposed at substantially right angles to the main body portion of said latching clip means, the outward extent of said peripheral edge portion means being larger than said hole in said workplate, (d) resilient tang means having an integral portion and a workplate engaging free end portions displaced radially outwardly from said tubular body means for engaging the side of said workplate opposite to said peripheral edge portion means, (e) said latching clip means being further formed with stop means displaced radially outwardly from the tubular body portion of said latching clip means in the area of said body means intermediate the free ends of said tang means and said peripheral edge, (f) deformable sleeve means having a neck portion means grippingly deformed to engage and fixedly mount said sleeve means to said cable housing means, said sleeve means having a base portion means integral therewith disposed adjacent to and folded over said peripheral edge means of said tubular latching clip means to provide a shoulder means, (g) gasket means having a predetermined thickness disposed intermediate said shoulder means of said sleeve means and the workplate when said latching clip means is inserted in the hole of said workplate, said gasket means being disposed in surrounding relationship to said tubular latching clip means in the vicinity of said stop means, and (h) resilient insert means interposed between said end portion of said cable housing means and said tubular latching clip means, said insert means having a necked down portion extendingly disposed in said aperture in said first end thereof in surrounding relation to said cable member, whereby insertion of said tubular latching clip to said hole in said workplate will cause said free end portions of said tang means to engage one side of the workplate and said gasket means to engage the other side, said thickness of said gasket means being such that it is trapped between and compressed into sealing engagement with said shoulder means of said sleeve means and said workplate to provide a strong sturdy cable assembly which is sealingly mounted to said workplate.

2. The cable assembly set forth in claim 1 wherein said deformable sleeve means neck portion means at the end thereof remote from said base portion means has a chamferred entering end to facilitate initial subassembly of said sleeve means with said cable housing.

3. The assembly set forth in claim 2 wherein said deformable sleeve means is a relatively soft metal.

4. The cable assembly set forth in claim 1 wherein said stop means on said tubular body portion of said latching clip means are spaced from said shoulder means a distance less than the predetermined thickness of said gasket means, said stop means providing back-up strength to said gasket means to prevent over-compression thereof and to absorb reaction force upon relative movement of said cable member to said cable housing means end portion.

5. The cable assembly set forth in claim 1 wherein said resilient insert means necked down portion is formed with a portion thereon having an inner diameter slightly less than the diameter of the cable member passing there through to provide a grease seal on relative outward movement of said cable member to said necked down portion and to prevent contaminants from entering the cable assembly upon reverse motion of said cable member.

6. The cable assembly set forth in claim 1 wherein said resilient insert means has a main body portion having an axial length slightly less than the length of the tubular body portion of said latching clip means whereby said resilient insert means floats between said sleeve means and said first end portion of said latching clip means prior to assembly of the brake cable housing means thereto, said construction facilitating initial assembly by preventing a bowing of said insert means allowing said end portion of said cable housing means to bottom said insert means adjacent said first end portion of said tubular clip means prior to clamping of said sleeve means to said cable means while protecting and providing lateral support to the cable housing means adjacent the end portion thereof.

7. The cable assembly set forth in claim 1 wherein said sharply flared peripheral edge means of said latching clip means comprises integral tabs in quadrature extending radially outwardly from the main body portion of said latching clip means, the outward extent of said tab means being greater than the radially outward extent of said tang means whereby said shoulder means formed by said sleeve means folded over said tab means provides a large bearing surface for sealing engagement with said gasket means.

8. The cable assembly set forth in claim 1 wherein said first end portion of said latching clip means comprises tab means in quadrature bent inwardly at substantially right angles to the main body portion of said latching clip means, the terminal ends of said inwardly directed tab means being curvilinear to locate and support the necked down portion of said resilient insert means.

9. The cable assembly set forth in claim 1 wherein said resilient tang means are formed in said latching clip means by blanking a U-shaped aperture in said tubular latching clip means, said stop means being formed in one edge surface of the U-shaped aperture in direct opposition to the tang means formed by said aperture.

10. The assembly set forth in claim 1 wherein said main body portion of said latching clip means is formed with three tang means, each of said tang means being curvilinear across the short dimension thereof.

11. For mounting a cable assembly adapted to pass through a hole in a workpiece wherein a metallic cable housing means and a cable member are relatively movable to each other and said cable housing means is to be relatively fixed to the workpiece, fastener means comprising:

(a) latching clip means of diameter for being surroundingly disposed to said cable housing means, said latching clip means being of generally tubular configuration having a first semiclosed end portion with an aperture therein smaller in diameter than said cable housing means and larger than said cable member, (b) said latching clip means at the opposite end having a sharply flared peripheral edge portion means disposed at substantially right angles to the main body portion of said latching clip means, the diameter as measured by the extreme outer extent of said peripheral edge portion being larger than said hole in said workplate, (c) retaining resilient tang means having first portions integral with and free end portions displaced radially outwardly from said tubular body means for engaging the side of said workpiece opposite to said peripheral edge portion means, (d) said clip means being formed with stop means displaced radially outwardly from the tubular body portion in the area of said body means intermediate the free ends of said tang means and said peripheral edge, (e) deformable sleeve means having a neck portion means deformable to engage and fixedly mount said sleeve means to said cable housing means and an enlarged base portion means integral therewith disposed adjacent to and folded over said peripheral edge portion means of said tubular latching clip means to form a shoulder means, (f) annular gasket means having a predetermined thickness disposed intermediate said shoulder means and said tang means in surrounding relationship to said tubular latching clip means in the vicinity of said stop means, and (g) hollow resilient insert means having an inner diameter for receipt of said cable housing means and an outer diameter for engaging the inner diameter of said tubular latching clip means, said insert means having a necked down apertured end portion extending through the aperture at said first end of said tubular clip means for engaging, protecting and sealing said cable member.

References Cited by the Examiner

UNITED STATES PATENTS

| | | | |
|---|---|---|---|
| 1,812,476 | 6/1931 | Godley | 339—126 |
| 2,128,040 | 8/1938 | Conners | 285—162 |
| 2,869,905 | 1/1959 | Bratz | 248—56 X |
| 2,954,248 | 9/1960 | Brickman | 285—162 X |
| 3,065,035 | 11/1962 | Biesecker | 308—15 |
| 3,101,205 | 8/1963 | Benham | 285—162 |
| 3,139,768 | 7/1964 | Biesecker | 151—41.75 X |
| 3,150,886 | 9/1964 | Briegel et al. | 285—161 |
| 3,182,279 | 5/1965 | Fitz Gerald | 339—128 X |
| 3,183,297 | 5/1965 | Curtiss | 285—162 X |

FOREIGN PATENTS 336,107　3/1959　Switzerland.

BROUGHTON G. DURHAM, *Primary Examiner.*